United States Patent [19]
Muller

[11] 3,987,715
[45] Oct. 26, 1976

[54] APPARATUS FOR THE AUTOMATIC PREPARATION OF BEVERAGES AND LIQUID FOODS

[75] Inventor: Walter E. Muller, Widen, Mutschellen, Switzerland

[73] Assignee: AVAG Betriebsverpflegungs A.G., Zurich, Switzerland

[22] Filed: June 19, 1975

[21] Appl. No.: 588,206

[30] Foreign Application Priority Data
June 28, 1974 Switzerland............... 8907/74

[52] U.S. Cl. ................................. 99/275
[51] Int. Cl.² ................................. C12H 1/06
[58] Field of Search ............ 99/275, 300, 305, 309, 99/323.2, 323.3, 323.6, 357

[56] References Cited
UNITED STATES PATENTS

| | | | |
|---|---|---|---|
| 2,096,522 | 10/1937 | Lambert | 99/323.2 |
| 2,776,074 | 1/1957 | Laurence | 99/275 X |
| 3,393,631 | 7/1968 | Harrison | 99/323.2 |
| 3,690,247 | 9/1972 | VanCleven et al. | 99/357 |

Primary Examiner—Peter Feldman
Assistant Examiner—Arthur O. Henderson
Attorney, Agent, or Firm—William J. Daniel

[57] ABSTRACT

An apparatus for automatically dispensing containers of a prepared liquid composition in which a plurality of containers each holding the ingredients for a particular liquid composition are stored in a storate device and are delivered one at a time to a mixing station for addition of a measured amount of water. A rod-like electrode, e.g. sonotrode, vibrated within the sonic and ultrasonic frequency range is introduced through the open end of the container for effecting mixing of the added water and ingredients by immersion therein, and a portion of the added water is used to flush the electrode surface free of residual material while the container and electrode are being moved relatively apart to withdraw the electrode therefrom.

8 Claims, 1 Drawing Figure

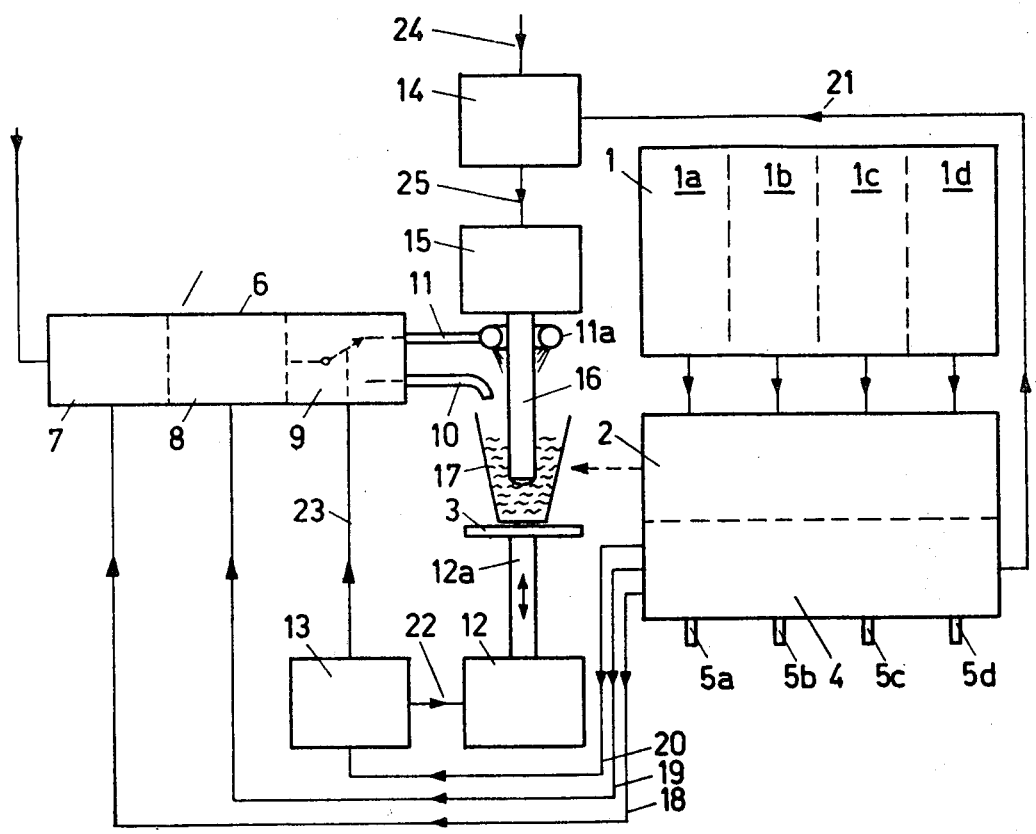

APPARATUS FOR THE AUTOMATIC PREPARATION OF BEVERAGES AND LIQUID FOODS

This invention relates to an apparatus for automatically preparing beverages and/or liquid foods from water and ingredients, with a storage device for a plurality of containers used for accommodating the prepared beverages or liquid foods, a device for removing one container at a time from the storage device, a device for supplying water which is provided with measuring means for measuring out a predetermined quantity of water depending on the capacity of the containers, and means for mixing each such predetermined quantity of water with the ingredients provided for the preparation of a particular beverage or liquid food, which means comprise a generator for producing electrical oscillations in the frequency range of sonic and ultrasonic vibrations, preferably ultrasonic vibrations, a converter for converting the electrical oscillations into mechanical vibrations, transmission means for transmitting the mechanical vibrations from the converter to the water to be mixed with the ingredients and means for establishing contact between the transmission means and the water provided with ingredients.

Apparatus of this kind are generally referred to as beverage vending machines. In the known beverage vending machines substantially two different structural principles have come into general use, that is to say a first principle in which the ingredients to be mixed with the water are accommodated in storage chambers within the beverage vending machine, and a second principle in which the ingredients to be mixed with the water are already distributed in portions in the individual containers in which the ready prepared beverages and liquid foods are given out.

Means for mixing the water with the ingredients are provided only in the case of the first structural principle. The means provided for this purpose in the apparatus mentioned at the outset are known for instance from German Published Specification No. 2,225,779. In the case of the second structural principle the mixing of the water with the ingredients takes place when the water runs into the container.

In the case of the first mentioned structural principle, the ingredients, for instance coffee powder, milk powder and sugar are first supplied from the corresponding storage chambers to a funnel-shaped mixing bowl and then water is supplied to the mixing bowl and runs together with the ingredients into a mixing container where the water and the ingredients are thoroughly mixed by means of a twirling device or other stirrer driven by an electric motor and may also be subjected to ultrasonic vibrations as in the apparatus mentioned at the outset, and then the finished beverage thus prepared is allowed to run out of the mixing container through an outflow duct into the container used for giving out the beverage or liquid food in question. In the case of this first structural principle very satisfactory mixing of water and ingredients is achieved, but this structural principle has various disadvantages which have become increasingly serious in recent times. One of these disadvantages is that water containing ingredients sometimes sprays out of the mixing bowl open at the top (for instance if water shocks occur in the water duct leading to the mixing bowl; this can occur more particularly in the case of water heated by means of a throughput heater) and also that ingredients sometimes remain stuck in the mixing bowl (for example at points of greater roughness on the surface of the mixing bowl) and that in these residues sprayed inside the beverage vending machine or stuck in the mixing bowl decay processes occur (for instance during a long pause in the use of the vending machine, such as during the night or, in the case of vending machines with a plurality of mixing devices, during a long pause in the use of one mixing bowl such as the mixing bowl for soup), unless cleaning of the interior of the vending machine and more particularly of the mixing bowl is carried out continually at short intervals of time. This continual cleaning, which is therefore as a rule prescribed for reasons of hygiene by the health authorities, now calls for a not inconsiderable expenditure of work, which results in increase in the total costs of manufacture of the beverages and liquid foods that are delivered. This cleaning can of course take place at the same time as the replenishment of the ingredients, but it is in the case of vending machines that are little used that the danger of such decay processes is the greatest, and in that case the replenishment of the ingredients is often necessary only after a great number of cleanings of the vending machine. Furthermore, these decay processes basically of course can also take place in places that are not visible during cleaning, for instance inside the mixing container or the outflow duct connected to this container, so that when the vending machine is cleaned, in addition to cleaning the visible parts such as the mixing bowl and the like it is also necessary to clean the parts that are not visible such as the inside of the mixing container and the outflow duct, and this still further increases the expenditure of work for cleaning. In addition, in the case of vending machines which give out a plurality of different kinds of beverages and liquid foods, because of the abovementioned sticking of ingredients in the mixing device it is not possible to use one the same mixing device for all beverages and liquid foods that are to be given out, and a separate mixing device must be provided at least for each kind of flavour and preferably for every sort of beverages and liquid foods that are to be given out. The expenditure of work for cleaning of course also increases with the number of mixing devices that are provided, so that more particularly beverage vending machines offering a rich variety of products and constructed in accordance with the first structural principle give rise to considerable maintenance costs. A further disadvantage of the abovementioned first structural principle is that the accurate measurement of the ingredients presents certain difficulties. Measurement by weight of the ingredients to be supplied to the mixing bowl would of course be technically possible and would then also lead to accurate measurement, but the cost of the apparatus necessary for ths would be far too high. As a rule, therefore, measurement is made not by weight but by volume, and this in turn has the result that the weights supplied are subject to considerable fluctuation. This applies more particularly to coarse-grained ingredients such as for instance freeze-dried coffee powder, because in the case of such coarse-grained ingredients the air volume, in the measurement space, formed by air interspaces can fluctuate considerably, mainly because when the storage device is completely filled with ingredients that is a relatively high filling pressure and therefore compression of the ingredients at the outlet from the storage device, but this filling pressure decreases more and more as the storage device is successively emptied. Now, in order to guarantee a beverage or liquid food provided with an adequate quantity of ingredients, the dimensions of the measurement space must be such that a sufficient quantity of ingredients is present even when the minimum possible weight is present in the measurement space, in other words, the average weight used for each beverage or liquid food is higher than the minimum necessary weight by a certain amount, that is to say by half the range of fluctuation of the weight in the measurement space. This extra expenditure of ingredients caused by measurement by volume of course also leads to an increase in the cost for the whole process of manufacture of the beverage or liquid food.

The abovementioned second structural principle, in which each container in the beverage vending machine already contains the ingredients necessary for the preparation of the beverage or liquid food to be prepared in the container in question, does not have the previously mentioned disadvantages of the first structural principle, because in this case the measurement of the ingredients in portions has already taken place in the factory and does not take place in the beverage vending machine, and in the factory, of course, measurement of the ingredients by weight calls for only a relatively very small extra expenditure as compared with the cost of the apparatus that would be necessary in each beverage vending machine, and moreover and more important, in this second structural principle there is no need for the mixing devices required in the case of the first structural principle, and therefore of course no need to clean such devices, because only hot water is supplied to the container having the ingredients already in it. But an essential and very serious disadvantage of this second structural principle is that because of the absence of the mixing devices the mixing of water and ingredients is very unsatisfactory because in this case mixing is effected only by the water running into the container and the eddying movements that occur, in the water that has already run in, when further water runs in. Therefore the second structural principle is that in the first place basically limited to those beverages and liquid foods which can be made with ingredients which are essentially easily soluble in or miscible with water. But even within this limited range of use, still further expedients are necessary in order to give the user of the beverage vending machine an even moderately well mixed beverage or liquid food. One of these expedients consists in this, that with each beverage or liquid food a stirring rod is also delivered, so that the user himself can achieve a better mixture by stirring. But there is no doubt that this solution is technically poor, because the mixture that can be obtained by means of a stirring rod actuated by hand in an open container is far inferior to that which can be obtained for instance in a mixing container with a stirring mechanism driven by an electric motor. With a stirring rod only ingredients easily soluble in water, such as for instance sugar, can be better dispersed, but in the case of ingredients that are insoluble or not easily soluble in water a good mixture cannot be obtained by means of a stirring rod. This is the main reason for the fact that this second structural principle is in practice actually used only for beverage vending machines which supply only coffee, tea and the like, that is to say beverages in which ingredients very easily soluble in water can be used. The stirring rod that is also delivered is then actually used only for stirring the sugar in the coffee or tea. But such ingredients which are very easily soluble in water are as a rule also very hygroscopic and therefore attract the moisture in the air as soon as they come into contact with the atmosphere (that is to say, after the opening of the vacuum packages of the "container bars" when the storage devices of the beverage vending machines are being refilled), and then are gradually converted into a viscous sticky material which is very difficult to dissolve in water and in any case cannot be uniformly dispersed in water when the water is simply poured on to it anad stirred with a stirring rod. IN order to avoid this, in the beverage vending machines according to the second structural principle only relatively small storage devices are provided, which contain only about 20 containers provided with the corresponding ingredients for each sort of beverage to be given out. This small number largely avoids long storage of the containers in the storage devices and consequently the transition of the ingredients in the containers into viscous material, but this small capacity of the storage devices has of course the disadvantage that the storage device has to be refilled practically daily or even several times a day, and this again causes corresponding expenditure of work and therefore increased costs. The disadvantages of the second structural principle are therefore its limited range of use, the need to deliver a stirring rod, the need for frequent refilling and the expenditure of work which this causes, and more particularly the fact that the mixture of the water and the ingredients is in many cases poor.

The invention was now based on the problem of providing an apparatus of the kind mentioned at the outset which units in itself the advantages of the abovementioned two structural principles but does not have their disadvantages, that is to say in which more particularly the troublesome and therefore costly cleaning of the mixing device is dispensed with as in the case of the abovementioned second structural principle, but in which on the other hand it is possible to obtain as good a mixture of the water and the ingredients as in the case of the first structural principle, and in which in addition it is possible to achieve the advantage of economy as regards the ingredients which is obtainable in the case of the second structural principle.

According to the invention, in an apparatus of the kind mentioned at the outset this is achieved by an arrangement in which the mixing of the water with the ingredients takes place in the container which is used for accommodating the beverage or liquid food which is finally ready after this mixing, and that each container in the storage device already contains the ingredients which are necessary for preparing the beverage or liquid food to be prepared in the container in question, and that the means for mixing the water with the ingredients comprise, as transmission means for transmitting the mechanical vibrations to the water, a rod-shaped "sonotrode" of which the free end remote from the converter is directed downwards, and, as means for establishing contact between the sonotrode and the water provided with the ingredients, a device for producing a relative movement of the sonotrode with respect to the container in which the mixing of the water with the ingredients takes place, which movement includes immersion of the free end of the sonotrode in the water, and that the device for removing each container from the storage device is provided with means for placing the removed container in a position leading to entry of the sonotrode into the container during the relative movement of the sonotrode with respect to the container, and that the device for supplying the water has at least one outflow duct of which the outlet is so arranged in the peripheral region of the sonotrode that the water flowing out of this outlet flow down the sonotrode into the container and cleans the sonotrode during this downflow.

In a preferred form of construction of the present apparatus the device for supplying water has at least two outflow ducts of which a first one has an outlet for direct flow into the container and a second one has an outlet arranged in the peripheral region of the sonotrode, and control means are then provided for at least partly filling the container by way of the first outflow duct and, preferably at the same time, causing the relative movement for the entry of the sonotrode into the container and then afterwards causing the relative movement in a rearward direction for withdrawing the sonotrode from the container and meanwhile completely filling the container by way of the second outflow opening, so that the sonotrode is cleaned simultaneously with its withdrawal from the container.

The special advantage of the present invention is that automatic cleaning of the sonotrode takes place during each mixing process, because the water flowing down on the sonotrode is set in vibration by the sonotrode and thereby releases from the sonotrode and takes away all ingredients sticking to the sonotrode. On the one hand this dispenses with the hitherto inevitable troublesome and costly cleaning of a mixing device when such a device was used, and on the other hand the automatically effected and very intensive cleaning of the snontrode has the result that very different beverages and liquid foods, for instance soup and then tea, can be prepared immediately after one another by one and the same sonotrode, whereas hitherto such different preparations could not be made immediately after one another in one and the same mixing device and either a separate mixing device has to be provided for each group of similar beverages or liquid foods or a separate cleaning process with hot water had to be interposed after each mixing process.

A further special advantage of the present apparatus is that the feature, taken over from the abovementioned second structural principle, that each container in the storage device already contains the ingredients that are necessary for the preparation of the beverage of liquid to be prepared in the container in question, does not call for a small number of containers in the storage device and the consequently necessary frequent refilling of the storage device, because in the present apparatus the mixing of the water and the ingredients is so intensive that even if hygroscopic ingredients have attracted a certain amount of water, satisfactory and complete mixing of the water and the ingredients is still achieved. In the present apparatus, therefore, a relatively large number of containers can be stored in the beverage vending machine without any danger that because of the long storage of the containers associated with this large number and the resultant greater attraction of moisture by the ingredients contained in the containers the mixture of the water and the ingredients will be incomplete.

As compared with vending machine constructed in accordance with the second structural principle, which as a rule supply only hot beverages because of the poor dissolution of the ingredients in cold water, the present apparatus has the further advantage that by means of this apparatus it is also possible to make cold beverages and the like because of the abovementioned intensive mixing of the water and the ingredients.

In addition to these particular advantages the present apparatus also unites in itself the special advantages of the abovementioned two structural principles without however having any of the special disadvantages of these structural principles.

In the present apparatus the sonotrode may advantageously have at its free end remote from the converter a curved and preferably convex end surface. This makes it possible to obtain a particularly satisfactory transmission of the mechanical vibrations to the water in the container, because by this means conical radiation is achieved for instance in the case of ultrasonic vibrations.

In the present apparatus each container in the storage device already contains the ingredients necessary for the preparation or the beverage or liquid food to be prepared in the container in question, and therefore the present apparatus may advantageously be so constructed in detail that the storage device has a number of storage spaces at least corresponding to the number of sorts of beverages and/or liquid foods that can be prepared, and each of these storage spaces is provided for a plurality of containers provided with ingredients for one and the same sort of beverage or liquid food, and that the device for removing one container at a time from the storage device is provided with control means, which can be actuated by the user of the preparation apparatus, for removing the container from that storage space which is associated with the sort determined by the user by actuation of the control means.

It is also to be noted that the device for supplying water in beverage vending machines which deliver cold and hot beverages and liquid foods comprises heating means for heating the water, preferably a throughput heater, and, if required, also cooling means for cooling the water, preferably a throughput cooler.

In the present apparatus the converter may advantageously convert the electric oscillations into mechanical vibrations with sonic vibration characteristics, preferably ultrasonic vibrations. For this purpose the converter may preferably comprise a piezoelectric converter. As an alternative to the conversion of the electrical oscillations into mechanical longitudinal vibrations that is to say vibrations with sonic vibration characteristics, a further advantageous possibility is that the converter may convert the electrical oscillations into mechanical transverse vibrations. In the latter case the converter for converting the electrical oscillations into mechanical transverse vibrations may advantageously comprise an electromagnetic converter.

The invention is described in further detail hereunder with reference to an embodiment illustrated in the sole figure of the drawing.

The embodiment of the present apparatus shown in the drawing comprises a storage device 1 for containers already provided with portions of ingredients, which is divided into a plurality of storage spaces 1a, 1b, 1d for different sorts of beverages or liquid foods, a container removing device 2 for removing one container at a time from the storage device 1 and conveying this container to a carrying member 3, a control 4, for the container removing device 2, which is provided with a number of control members 5a, 5b, 5c, 5d, corresponding to the number of different beverages and/or liquid foods that can be prepared, for selection of the required beverage or liquid food, and which causes the container removing device 2 to remove the container from the corresponding storage space and which also controls all other processes associated with the preparation of the beverage or liquid food within the apparatus and also comprises the cash unit with coin inlet, coin tester, coin container and the like, water supply device 6 with a throughput heater 7 for heating the water supplied for hot beverages or liquid foods and with water measuring means 8 for measuring out respective quantities of water corresponding to the capacity of the containeres and with a two-way cock 9, adapted to be changed over, for conducting the water to a respective one of two outflow ducts 10 and 11, a relative movement device 12 for raising and lowering the carrying members 3, control means 13 for so controlling the two-way cock 9 and the relative movement device 12 that the two-way cock 9 leads to the outflow duct 10 while the carrying member 3 is being raised and to the outflow duct 11 while the carrying member 3 is being lowered, a generator 14 for producing an alternating current in the frequency range of ultrasonic vibrations, a piezoelectric converter 15 connected to the generator 14, for converting the alternating current delivered by the generator 14 into ultrasonic vibrations and a rod-shaped sonotrode 16 for transmitting the ultrasonic vibrations produced by the piezoelectric converter 15 to the water in the container 17. In addition, for delivering cold beverages a throughput cooler not shown in the drawing may be provided parallel to the throughput heater 7.

The storage device 1, the container removing device 2, the control 4 and the part of the water supply device 6 comprising the throughput heater 7 (and the throughput cooler if provided) may be formed, with the exception of some special details which will be described hereinafter, in the same way as in the case of the beverage vending machines, mentioned at the outset, which are constructed in accordance with the previously mentioned second structural principle. In the present description it is therefore unneccessary to describe the detailed structure of these components of the present apparatus (except where it is associated with the special details mentioned previously).

The special details in which these components of the present apparatus differ from the corresponding components of the known beverage vending machines constructed in accordance with the second structural principle, mainly concern the control 4. As shown in the drawing, in addition to the control conductors 18 and 19 leading to the throughput heater 7 and the water measuring means 8, which are also to be found in the known beverage vending machine constructed in accordance with the second structural principle, the control 4 also has the control conductor 20 leading to the control means 13 and the control conductor 21 leading to the generator 14. These two control conductors 20 and 21 carry a control pulse from the time at which the container removing device 2 has completed the delivery of the container removed from the storage device 1 to the carrying member 3, to the time at which the preparation is completed. The water measuring means 8 receive a control pulse from the control 4 during the same period of time, and therefore these control conductors 20 and 21 may be connected directly to the control conductor 19 within the control 4. This difference between the control 4 of the present apparatus and the control of the known beverage vending machines constructed in accordance with the second structural principle is thus only very slight and could moreoover be completely avoided by an arrangement such that the connection of the control conductors 20 and 21 to the control conductor 19 is shown outside the block representing the control 4 is the drawing.

Those components of the embodiment of the present apparatus shown in the drawing that are not contained in the known beverage vending machine constructed in accordance with the second structural principle are the part of the water supply device comprising the two-way cock 9 and the second outflow duct 11, the relative movement device 12, the control means 13, the generator 14, the piezoelectric converter 15 and the sonotrode 16.

The controllable two-way cock 9 indicated by brokeen lines in the drawing has its inlet duct connected to the outlet duct of the water measuring means 8 and its two outlet ducts connected to the outflow ducts 10 and 11 and comprises an electromagnet for changing over to one or the other of its two outlet ducts. When no current is supplied to the electromagnet, the inlet duct of the two-way cock is connected to the outlet duct of the two-way cock communicating with the outflow duct 10, and when current is supplied to the electromagnet the inlet duct of the two-way cock is connected to the outlet duct of the two-way cock communicating with the outflow duct 11. Electromagnetically controllable two-way cocks of this kind are obtainable and are known as magnet valves.

The second outflow duct 11 of the water supply device leads to a ring nozzle 11a which surrounds but is not in mechanical contact with the sonotrode 16, and is provided in its lower region with uniformly distributed outflow holes of which the hole axes are directed towards the sonotrode 16 so that the water flowing out of these outflow holes first flows in the form of jets to the sonotrode 16 and then down on the sonotrode into the container.

The relative movement device 12 comprises the carrying member 3 for the container 18 and the lifting rod 12a and also a vertically located hydraulic pressure cylinder with a plunger of which the plunger rod forms the lifting rod 12a, a pressure medium container for the hydraulic pressure medium, a communication duct leading between the pressure medium container and the pressure cylinder by way of a gear pump, an electric motor for driving the gear pump and a bypass duct bypassing the gear pump by way of an electromagnetically controllable valve. The electric motor and the electromagnetically controllable valve are electrically in parallel and are connected to a current supply conductor 22 coming from the control means 13. When current is supplied by way of this current supply conductor 22 the gear pump is driven by the electric motor and then pumps hydraulic pressure medium from the pressure medium container into the pressure cylinder, so that the plunger in the pressure cylinder and therefore also the plunger rod 12a, the carrying member 3 and the container 17 are raised. The stroke of the pressure cylinder corresponds approximately to the height of the container 17. When the electric motor is switched on the electromagnetically controllable valve is also actuated and the bypass duct bypassing the gear pump is thereby closed. As soon as the current supply by way of the current supply duct 22 ceases, the gear pump is no longer driven and at the same time the bypass duct bypassing the gear pump is opened by the electromagnetically controllable valve, so that now the hydraulic pressure medium can flow by way of the abovementioned communication duct and the aforesaid bypass duct back into the pressure medium container which is located lower down, whereby the plunger in the pressure cylinder and likewise the plunger rod 12a, the carrying member 3 and the vessel 17 descend again.

The control means 13 comprise a relay-controlled electrical changeover switch with an input conductor which is connected to the control conductor 20, and two input conductors of which one is connected to the current supply conductor 22 by way of a first winding of the relay provided for controlling the changeover switch and the other is connected by way of a second winding of the relay to the control conductor 23 leading to the two-way cock 9; The relay is so formed that when the relay is in the inoperative position the changeover switch connects the control conductor 20 to the current supply conductor 22. The dimensions of the abovementioned first winding of the relay are such that the normal current consumption of the electric motor and of the electromagnetically controlled valve in the relative movement device 12 and also the current surge that occurs when these two are switched on cannot cause the relay to act, but when thr pressure cylinder in the relative movement device 12 has reached its full stroke and the electric motor therefore cannot deliver any more hydraulic pressure medium into the pressure cylinder and is therefore strongly braked in its movement and consequently has a substantially higher current consumption, the relay acts and the changeover switch in the control means 13 is thereby changed over to the output conductor leading to the control conductor 23. The second winding of the relay is a normal holding winding and its dimensions are accordingly such that the current consumption of the electromagnet controlling the two-way cock 9 is sufficient to keep the relay in the operative state until the control pulse delivered by way of the control conductor 20 has come to an end, whereupon the relay becomes inoperative again and the changeover switch is switched back to its output conductor leading to the conductor 22.

The geneerator 14 is an ordinary RC generator, that is to say a self-oscillating amplifier with strong feedback, with an RC network for fixing its frequency of oscillation. Mains current is supplied to the generator by way of the mains conductor 24, and when switched on the generator delivers through its output conductor 25 an alternating current with a frequency of oscillation in the frequency range of ultrasonic vibrations, that is to say for instance 20 kHz. The generator 14 also comprises a switching-on relay of which the relay winding is connected to the control conductor 21 and which switches the generator 14 on when current is supplied by way of the control conductor 21.

The piezoelectric converter 15 is connected on the input side to the output conductor 25 of the generator 14 and comprises a vibrating quartz which converts the alternating current supplied by the generator into mechanical vibrations, and coupling means for transmitting these mechanical vibrations produced by the vibrating quartz to the rod-shaped sonotrode 16.

The sonotrode 16 coupled to the vibrating quartz is used for transmitting the mechanical vibrations produced by the vibrating quartz in the piezoelectric converter 15 from this vibrating quartz to the water in the container 17, and consists of a titanium alloy and has at its bottom end a convex end surface producing better radiation of the ultrasonic vibrations into the water.

The manner of operation of the embodiment of the present apparatus illustrated in the drawing is as follows. The user of the apparatus first selects the required beverage or liquid food by pressure on one of the control members 5a to 5d and then initiates the preparation of this beverage or liquid food by inserting coins into the abovementioned cash unit contained in the control 4. After coin testing and after the coins have been found to be correct, the cash unit first gives a release signal to the control 4, whereupon the control 4 causes the container removing device 2 to remove a container from the storage space 1a, 1b, 1c or 1d of the storage device 1 corresponding to the required beverage or liquid food and to convey this container to the carrying member 3 which up to this time is still lowered. As soon as this is finished, the container removing device gives a completion signal to the control 4. After receiving this completion signal the control 4 supplies current to the control conductors 19, 20 and 21, and also to the control conductor 18 in a case in which the required beverage or liquid food is a hot beverage or liquid food. This supply of current firstly causes the water measuring means 8 to be switched on, secondly causes the relative movement device 2 to be switched on by way of the control means 13 and thirdly causes the generator 14 and, if required, the throughput heater 7 also to be switched on. When the water measuring means is switched on this causes the water to begin to run through this measuring means and at the same time initiates the measurement of the quantity of water corresponding to the corresponding to the capacity of the container 17. The measurement is effected in a known manner either by means of a water meter interposed in the throughput duct or with the aid of a measuring container which has the same capacity as the container 17 and which is first very rapidly filled through the inlet of the water measuring means and then slowly emptied through the outlet of the water measuring means. But it is also possible to use two measuring containers, of which the full one is emptied through the outlet of the water measuring means and at the same time the empty one is refilled through the inlet of the water measuring means; in the latter case, however, the throughput heater is to be arranged after the water measuring means and not before them as in the drawing. When the water measuring means 8 and if necessary the throughput heater 7 are switched on, the relative movement device 12 is switched on at the same time, and the effect of this is that the carrying member 3 and also the container 17 are slowly raised. At the same time, during this raising movement water flows through the outlet duct 10 of the water supply device 6 into the container 17. When the water measuring means 8 and if necessary the throughput heater 7 are switched on and the relative movement device 12 is set in operation, the generator 14 is switched on at the same time and this causes the piezoelectric converter 15 to be supplied with alternating current and causes this to be converted into ultrasonic vibrations which are transmitted to the sonotrode 16 and set it in vibration. The raising of the carrying member 3 causes the sonotrode 16 to enter the container 17 and shortly afterwards to enter the water which has already flowed into the container from the outflow duct 10 during this movement, and now to transmit the ultrasonic vibrations to the water in the container 17. The vibrations of the water in the container 17 that are thus generated produce intensive mixing of the water and of the ingredients in the container. As the lifting member 3 is raised further, the sonotrode 16 enters further and further into the water which is in the container 17 and which continues to flow in through the outflow duct 10, until the carrying member 3 has reached its highest position. This happens when the plunger of the abovementioned pressure cylinder in the relative movement device 12 has completed its full stroke. At this moment, as already described above the current consumption of the electric motor in the relative movement device 12 increases substantially and as a result the abovementioned relay in the control means 13 operates and thereby disconnects the control conductor 20 from the conductor 22 and connects it to the conductor 23. This switches on the current supply to the electromagnetically controlled two-way cock 9 and the two-way cock is thereby changed over from the outflow duct 10 to the outflow duct 11. At the same time the current supply of the relative movement device 12 is switched off and the abovementioned bypass duct bypassing the gear pump is opened so that now the hydraulic pressure medium can flow out of the pressure cylinder in the relative movement device 12 back into the pressure medium container. This causes the carrying member 3 to begin to descend again, and at the same time water flows by way of the outflow duct 11 and the tore 11a and the outflow holes present in this tore and then runs on the sonotrode 16 down into the container 17. The drawing shows the apparatus at this moment and in this state. The water flowing down on the sonotrode 16 cleans the sonotrode 16 which gradually comes out of the container 17 again as the carrying member 3 descends. Any ingredients and the like which remain sticking to the sonotrode 16 are so completely cleaned off by this water flowing down on the sonotrode that afterwards no further residues can be found on the sonotrode 16 even by microscopic examination. This completeness of cleaning is due to the fact that the water flowing down on the sonotrode is also subjected to ultrasonic vibrations and therefore releases all residues from the sonotrode. The inflow of water by way of the outflow duct 11 and the tore 11a ceases shortly after the sonotrode 16 has come out of the finally prepared beverage or liquid food now in the container 17, and a little later, when the snontrode 16 has come completely out of the container 17, the carrying member 3 reaches its lowest position, and at this moment the control 4 switches off the current supply to the control conductors 19, 20 and 21 and 18 if required, whereby firstly the generator 14 is switched off and therefore the sonotrode 16 creases to vibrate, secondly the supply of current to the electromagnet of the two-way cock 9 is switched off and the two-way cock 9 is thereby changed over to the outflow duct 10 again and at the same time also the abovementioned relay in the control means 13 ceases to operate and the control conductor 20 is changed over to the conductor 22 again, and thirdly the water measuring means 8 is switched off and the flow of water through the water supply device 6 is shut off. It is also to be noted that the design of the water supply device 6 and that of the relative movement device 12 and that of the control 4 are so adjusted with respect to one another that the total time for the raising and lowering again of the carrying member 3 by the relative movement device 12 corresponds approximately to the total time during which a quantity of water corresponding to the capacity of the container 17 flows through the water supply device 6, and during the whole of this time the control 4 supplies current to the control conductors 19, 20 and 21 and 18 if required, and also that during the raising of the carrying member 3 about 60 to 80% of the aforesaid quantity of water flows into the container 17 by way of the outflow duct 10. Alternatively, however, instead of adjustment of the control 4 to the aforesaid total time the supply of current to the control conductors 19, 20, 21 and 18 if required can be switched off by the control 4 with the aid of a termination signal supplied to the control 4 by the relative movement device 12; this signal is emitted by the relative movement device 12 when the carrying member 3 and therefore the plunger of the abovementioned pressure cylinder in the relative movement device 12 have reached their lowest position. The finally prepared beverage or liquid food can now be taken by the user from the carrying member 3 which has now been lowered again. The apparatus itself is again in the starting state and is thererfore ready for the preparation of a further beverage or liquid food.

Finally, it is also to be noted that the mechanical vibrations used in the present apparatus for mixing the water and the ingredients and for cleaning the sonotrode were preferably mechanical longitudinal vibrations, that is to say sonic vibrations, and preferably ultrasonic vibrations. In most cases the best results as regards mixing and cleaning are obtained with ultrasonic vibrations. But investigations have shown that in many cases sonic vibrations below the ultrasonic range give very good and often actually better results. Moreover, further investigations have also shown that in certain cases of use very good results can also be obtained with mechanical transverse vibrations, that is to say vibrations transverse to the direction of propagation of the vibration.

In regard to the embodiment illustrated in the drawing it should also be stated, for the sake of completeness, that in cases in which the present apparatus is also to supply cold beverages and the temperature of the water coming from the water supply system is not low enough and at times, for instance on hot summer days, is above the temperature at which the cold beverages are to be delivered, as already mentioned previously a throughput cooler may be provided in addition to the throughput heater, or instead of the throughput heater if only cold beverages are to be delivered. The control of a throughput cooler of this kind can be effected in the same way as the control of the throughput heater 7, by means of the control 4.

I claim:

1. In an apparatus for automatically dispensing a liquid composition, such as beverages, liquid foods and the like prepared from water and ingredients, having a storage device for a plurality of open containers for the composition, a device for delivering one container at a time from the storage device to a mixing station, a device for supplying water to each container at said station including measuring means for measuring out a predetermined quantity of water according to the capacity of the containers, and means at said station for mixing such predetermined quantity of water with the composition ingredients, said mixing means comprising a generator for producing electrical oscillations in the frequency range of sonic and ultrasonic vibrations, a converter for converting the electrical oscillation into mechanical vibrations, transmission means for transmitting the mechanical vibrations from the converter to the water to be mixed with the ingredients, and means for introducing said transmission means into the interior of said container, the improvement characterised in that:
  a. the mixing of the water with the ingredients takes place in each container which already contains the igredients necessary for the particular compositon to be prepared therein;
  b. the mixing means comprises as said transmission means, a rod-shaped sonotrode with a downwardly directed free end, and, as said means for introducing the sonotrode into the container, a device for producing a relative movement between the sonotrode and container to introduce the sonotrode free end through the container opening for immersion in the water and remove the same therefrom;
  c. the container delivering device is provided with means foir delivering each container to said relative movement producing device; and
  d. the device for supplying the water has at least one outflow duct terminating in an outlet adjacent the periphery of the sonotrode that the water flowing from said duct flows down the sonotrode into the container and thereby cleans the sonotrode.

2. Apparatus according to claim 1, characterised in that the device for supplying water has at least two outflow ducts, one of which has an outlet for direct flow into the container and the other has said outlet adjacent the periphery of the sonotrode, and control means are provided for at least partly filling the container by way of the first outflow duct while causing the relative movement for entry of the sonotrode into the container and therefore causing an opposite relative movement for withdrawing the sonotrode from the container while concurrently filling the container by way of the second outflow opening, so that the sonotrode is cleaned simultaneously with its withdrawal from the container.

3. Apparatus according to claim 1, characterised in that the sonotrode has at its free end a curved convex end surface.

4. Apparatus according to claim 1, characterised in that the storage device has a number of storage spaces at least corresponding to the number of types of liquid compositions that can be prepared, and each of these storage spaces holds a plurality of containers provided with ingredients for a given composition, said device for removing one container at a time from the storage device is provided with control means, which can be actuated by the user, for removing the container from that storage space corresponding to the desired composition.

5. Apparatus according to claim 1, characterised in that the device for supplying water comprises heating means for heating the water;

6. Apparatus according to one of claim 1, characterised in that the converter for converting the electrical oscillations into mechanical vibrations with comprises a piezoelectric converter.

7. Apparatus according to one of claim 1, characterized in that the converter converts the electrical oscillations into mechanical vibrations moving transversely of the sonotrode length.

8. Apparatus according to claim 7, charcterised in that the converter for converting the electrical oscillations into mechanical transverse vibrations comprises an electromagnetic converter.

* * * * *

UNITED STATES PATENT OFFICE
CERTIFICATE OF CORRECTION

PATENT NO. : 3,987,715
DATED : October 26, 1976
INVENTOR(S) : Walter E. Muller

It is certified that error appears in the above-identified patent and that said Letters Patent are hereby corrected as shown below:

Column 13, line 9 (claim 1, line 3 of subparagraph a.), "igredients" should read -- ingredients --.

Column 13, line 20 (claim 1, line 2 of subparagraph c.), "foir" should read -- for --.

Column 13, line 35 (claim 2, line 9), "therefore" should read -- thereafter --.

Column 14, line 25 (claim 6, line 3), "with" should be deleted.

Signed and Sealed this

Twenty-eighth Day of December 1976

[SEAL]

Attest:

RUTH C. MASON
Attesting Officer

C. MARSHALL DANN
Commissioner of Patents and Trademarks